United States Patent Office 3,254,003
Patented May 31, 1966

3,254,003
PROCESS FOR REMOVING TRANSGLUCOSIDASE FROM AMYLOGLUCOSIDASE
Willard Joseph Croxall, Elkhart, Ind., assignor to Miles Laboratories, Inc., Elkhart, Ind., a corporation of Indiana
Filed Jan. 2, 1964, Ser. No. 335,009
6 Claims. (Cl. 195—66)

This invention relates to a process for the purification of amyloglucosidase. More particularly, it relates to the use of cationic ion-exchange materials for removing transglucosidase impurity from amyloglucosidase.

Amyloglucosidase, an enzyme which has also been referred to as glucamylase, glucogenic enzyme, starch glucogenase, gamma-amylase and α-1,4-glucan glucohydrase, is a well-known material which catalyzes the hydrolysis of starch, dextrins or maltose to dextrose. This enzyme appears to aid in the formation of dextrose directly from starch without the production of intermediate products, such as higher sugars and soluble dextrins. This enzyme is also capable of catalyzing the hydrolysis of intermediate starch hydrolysis products to dextrose.

Amyloglucosidase is known to be prepared by fermentation processes employing certain strains of fungi belonging to the *Aspergillus niger* group and certain strains of Rhizopus species. Illustrative fungi are those of the species *Aspergillus niger, Aspergillus oryzae, Rhizopus delmar, Aspergillus phoenicis* and the like.

The fungal strains producing amyloglucosidase are also known to produce other enzymes, such as transglucosidase. Transglucosidase promotes the formation, particularly from maltose and glucose, of unfermentable carbohydrates. When transglcosidase is present as a contaminant in amyloglucosidase employed to hydrolyze starch to dextrose, lower yields of dextrose are obtained than if the transblucosidase were absent. The presence of transglucosidase in the usual amyloglucosidase prpearations has been generlaly recognized and considerable work has been carried out to reduce and substantially eliminate the transglucosidase impurity in amyloglucosidase.

Prior art methods for removing transglucosidase from amyloglucosidase have employed clay, synthetic magnesium silicate, fuller's earth, and anionic ion-exchange materials to selectively adsorb the transglucosidase. Generally, these methods involved adsorption of all the amyloglucosidase and transglucosidase with selective elution of the amyloglucosidase in a purified form. Such "adsorption-elution" methods are complex and are not completely satisfactory. Selective precipitation has also been employed. None of the prior art purification methods removed all the transglucosidase impurities. Also, the prior art purification methods generally involved a loss of amyloglucosidase.

It is an object of the present invention to provide a process which removes all detectable amounts of transglucosidase fro amyloglucosidase.

Another object of the present invention is to provide a simple process for removing transglucosidase from amyloglucosidase.

Still another object is to provide a process for purification of amyloglucosidase that minimizes loss of amyloglucosidase.

Figure 1:
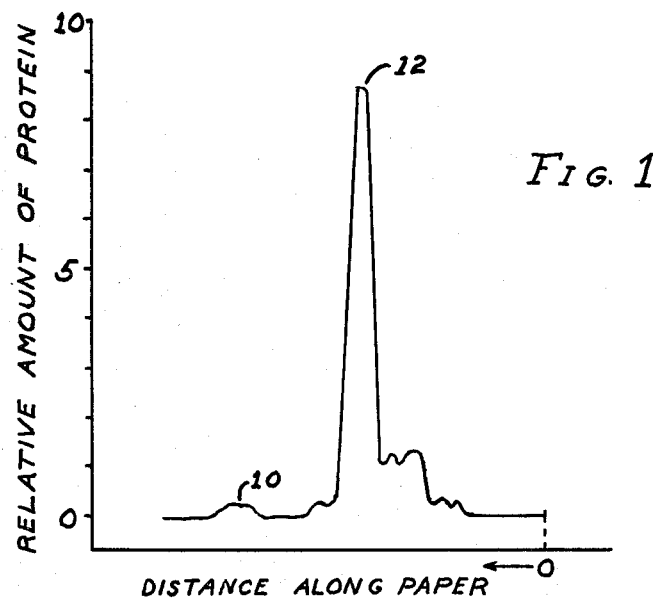
FIG. 1 is a density plot of an electrophoretic chromatogram obtained from a prior art amyloglucosidase containing a transglucosidase impurity.

In accordance with the present invention, a cationic ion-exchange material is contacted with an amyloglucosidase solution containing transglucosidase impurity to selectively adsorb the transglucosidase impurity by the cationic-exchange material without adsorbing any appreciable amount of amyloglucosidase. This is conveniently carried out by the simple process of flowing an aqueous solution of amyloglucosidase containing a transglucosidase impurity through a bed of cationic ion exchange material and withdrawing the so purified amyloglucosidase solution from the bed. The transglucosidase remains behind in the bed. Alternatively, cationic ion-exchange material can be introduced to an amyloglucosidase solution, allowed to remain until transglucosidase impurity is adsorbed and then the cationic material containing the transglucosidase impurity can be separated, if desired, from the amyloglucosidase. This process removes all detectable amounts of transglucosidase impurities from amyloglucosidase with minimum loss of amyloglucosidase.

The process of the present invention is useful for purifying amyloglucosidase in various forms. It can be in the form of aqueous whole cultures and fermentation beers known in the art. It can be in the form of dried material which is then dissolved in aqueous media for use in the present process. The concentration of amyloglucosidase in the aqueous solution is not critical. As is known in the art, dilute solutions will require large quantities of liquid material to be processed in order to purify a given quantity of amyloglucosidase. The more concentrated solutions will enable a given quantity of amyloglucosidase to be purified with less effort and in a shorter period of time.

The cationic ion-exhange materials useful in this novel process are preferably in a solid form. The solid forms, such as solid resins, are preferred since they provide a separate phase and are easily separated from the purified amyloglucosidase solutions. These solid materials are use in granular form of convenient size so that they do not create substantial resistance to fluid flow through a packed bed of the materials. Such considerations are well known in the art. The cationic ion-exchange materials are well known and are available commercially from several sources. Typical acidic cation-exchange materials and their preparation are described, for example, in U.S. 2,340,110; 2,366,007; and 2,681,320. Such materials can consist, for example, of polymerized styrene-divinylbenzene containing reactive ion-exchange sites. Other materials, such as phenol-formaldehyde resins, polystyrene and coal derivatives, can also be employed which contain the proper reactive sites. In the strongly-acidic cation-exchange materials the reactive sites are generally sulfonic acid groups. In the intermediate-acidic cation-exchange materials the reactive sites are generally phosphoric acid groups. In the weakly-acidic cation-exchange materials the reactive sites are generally carboxylic acid groups. Salts of the above acidic groups, such as the sodium and potassium salts, can also be employed as the reactive sites in the cationic ion-exchange materials. Other cationic ion-exchange materials useful in the present invention are the carboxymethylcellulose and phosphate-cellulose described in J. Am. Chem. Soc. 78, 751–755 (1956).

Strongly-acidic cation-exchange materials useful in the present invention are sold under the following illustrative trade names by the indicated suppliers:

| Reactive Group | Trade Name | Supplier |
|---|---|---|
| Sulfonic | Dowex 50w-x-8 | Dow Chemical Co. |
| Do | Amberlite 200 | Rohm and Haas Co. |
| Do | Amberlite IR-120 | Do. |
| Do | Permutit Q | The Permutit Co. |
| Do | Zeo-Karb | Do. |
| Do | Nalcite HCR | National Aluminate Co. |
| Do | Nalcite HGR | Do. |
| Do | Nalcite HDR | Do. |

Intermediate-acidic cation-exchange material useful in the present invention is sold under the following illustrative trade name by the indicated supplier:

| Reactive Group | Trade Name | Supplier |
|---|---|---|
| Phosphoric | Duolite C-65 | Chemical Process Co. |

Weakly-acidic cation-exchange resins useful in the present invention are sold under the following illustrative trade names by the indicated suppliers:

| Reactive Group | Trade Name | Supplier |
|---|---|---|
| Carboxylic | Amberlite IRC-50 | Rohm and Haas Co. |
| Do | Permutit H-70 | The Permutit Co. |

The cationic ion-exchange materials should be properly purified and placed in the desired reactive form before use in the present process. The materials which are supplied in the free acid form are allowed to stand in contact with distilled or deionized water at room temperature for several hours in order to remove any color or other leachable material. The material is then washed several times with distilled water, filtered and used. If a particular acidic pH value for the material is desired, the material is treated with acid, such as hydrochloric acid, and then washed with distilled water until desired pH is obtained. The cationic material is then used. The materials which are supplied in the salt form, such as the sodium salt of sulfonic acid ion-exchange material, are also washed with distilled water to remove color or other leachable material and are then treated with alkali, such as sodium hydroxide, and washed with water until the desired pH is obtained for the cationic materials. They are then used in the process of the present invention.

As the cationic ion-exchange material purifies amyloglucosidase, it becomes loaded with the transglucosidase impurity and the number of useful reactive sites decreases. It must then be regenerated for further use. The free acid forms of cationic ion-exchange materials are generally regenerated by treating them with an acid, such as hydrochloric acid, and then washing the material to remove the transglucosidase impurity. The material is then adjusted to proper pH as described above and then reused. The salt forms of cationic ion-exchange materials are generally regenerated by treating them with an alkali, such as sodium hydroxide, and then washing the material to remove impurities. The material is then adjusted to proper pH as described above and then reused. When the cationic ion-exchangers are properly regenerated, as is well known in the art, they can be reused indefinitely since they are not consumed during the process of removing the transglucosidase impurity from amyloglucosidase.

The capacity of cationic ion-exchange materials for removal of transglucosidase impurity from amyloglucosidase will vary for each particular material. This capacity can be experimentally determined for each material by methods well known in the art.

The process conditions for carrying out the present invention are not narrowly critical. Temperatures from about 0° C. to about 60° C. can be employed. At temperatures below about 0° C. the amyloglucosidase solutions will tend to freeze. At temperatures above about 60° C. the amyloglucosidase will become inactivated. Preferably, temperatures of about 20° C. to about 30° C. are employed. The process can also be carried out under pH values from about 3.5 to about 9.5. Atmospheric pressure conditions are preferably employed but pressures above and below atmospheric can be used if desired, with no material advantages. The contact time between amyloglucosidase solution and cationic ion-exchange material is governed by the time required for the amyloglucosidase solution to pass through the bed of granulated cationic ion-exchange material. Such reaction times are not critical in this process.

The process of the present invention removes transglucosidase from amyloglucosidase with minimum loss of amyloglucosidase. Methods are provided for determining amyloglucosidase content (defined in terms of activity units per ml.) of starting material and purified material to measure amyloglucosidase recovery. Transglucosidase removal is determined by incubating a maltose solution with the amyloglucosidase purified by the present process and measuring optical activity (specific rotation) of resulting product. This specific rotation value is then compared with the specific rotation value obtained by incubating a maltose solution with amyloglucosidase which has not been purified by the present process. The specific rotation value obtained with purified material will be lower than the optical rotation value obtained with the unpurified material. The higher the specific rotation value of any given sample, the higher will be the transglucosidase content.

These determination methods are described below:

Amyloglucosidase activity

An aqueous solution is prepared containing 4.0 g. of soluble starch (moisture-free basis) and 5.6 ml. of 1.1 M acetate buffer, pH 4.2, per 100 ml. Exactly 50 ml. of the buffered starch solution is pipetted into a 100 ml. volumetric flask and equilibrated in a water bath at 60° C. for 15 minutes. Then 1.0 ml. of enzyme solution, properly diluted so that 20% to 30% hydrolysis will occur during the incubation period, is added and mixed. After exactly 60 minutes of incubation in the water bath at 60° C., the solution is adjusted to a pink phenolphthalein end point by adding 2 N sodium hydroxide. The solution is then cooled to room temperature and diluted to volume with distilled water. Reducing sugar, calculated as dextrose, is determined on the diluted sample and on a blank solution treated in the same way but with no added enzyme by the Schoorl or similar methods. Amyloglucosidase activity is calculated from the formula:

$$A = \frac{S-B}{E}$$

where, $A$ = amyloglucosidase activity, units per ml. of enzyme preparation.
$S$ = reducing sugars in enzyme treated sample, grams per 100 ml. diluted sample.
$B$ = reducing sugars in blank, grams per 100 ml. diluted sample.
$E$ = amount of enzyme used, ml. per 100 ml. diluted sample.

Transglucosidase activity

A solution of maltose is prepared by dissolving 100.0 g. C.P. maltose in distilled water and diluting to 500 ml. A 50.0 ml. portion of this 20 weight percent (percent w./v.) maltose solution is then placed in a 100 ml. flask and diluted to 100 ml. with distilled water. To the flask is added 5 ml. of 1.0 M acetate buffer, pH 4.0. After mixing, an amount of enzyme preparation containing 5.0 units of amyloglucosidase activity is added. The flask is placed in a 60° C. water bath and heated for 48 hours. At the end of this incubation period, the optical rotation of the sugar solution is measured by well-known techniques. The higher the specific rotation measured at 25° C., $[\alpha_D^{25}]$, the higher will be the transglucosidase activity or content of the enzyme preparation being tested.

The present invention will be further described in the following illustrative examples.

EXAMPLE 1

A 50 ml. portion of Duolite C-65 cationic ion-exchange material in the free phosphoric acid form was placed into a 2 cm. I.D. vertical glass tube. The cationic material was supported in a conventional manner. The cationic material was washed to a pH of 4.5. A 930 ml. sample of aqueous amyloglucosidase solution containing a transglucosidase impurity was passed under force of gravity at room temperatures down through the packed ion-exchange bed and was collected in twenty-one fractions of about 45 ml. each. The amyloglucosidase solution was obtained from a fermentation of aqueous corn mash with a fungus strain of the *Aspergillus niger* group. The filtrate from this fermentation was used. Analyses of aliquots of the treated and untreated amyloglucosidase solutions indicated a recovery of 91.34 percent of the amyloglucosidase activity in the purified product. Transglucosidase activity was measured on the untreated starting material and on each of the twenty-one product fractions. Specific rotation of the starting material was $[\alpha_D^{25}] = 55.4$. Average specific rotation for the product fractions was 53.8. This significant reduction in optical rotation of the product indicates substantial removal of transglucosidase impurity.

Figure 2:
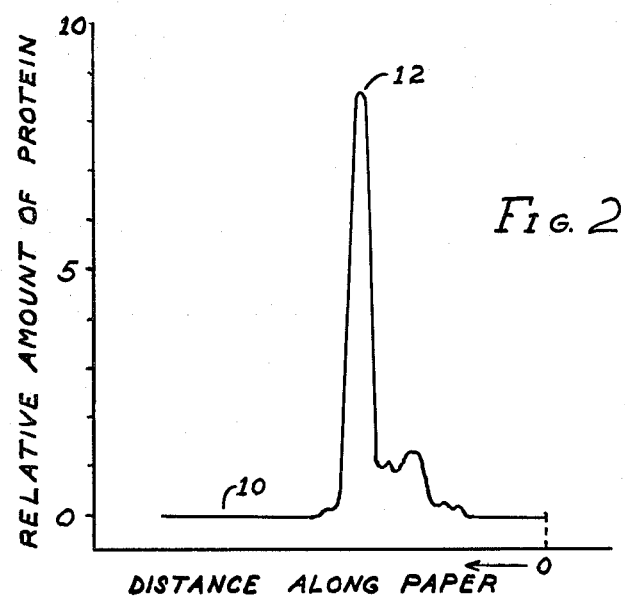
FIG. 2 is a density plot of an electrophoretic chromatogram obtained from amyloglucosidase treated by the process of the present invention.

Purification was indicated in another manner. Samples of untreated and purified amyloglucosidase solutions were subjected to paper electrophoresis at 250 v. for 2 hours at a current of 0.6 ma./cm. width in the presence of veronal buffer at pH 9.6 and ionic strength of 0.1. Density plots were then made of the resulting electrophoretic chromatograms. FIG. 1 shows the density plot obtained from the untreated starting material. The relative amount of protein (enzyme) present at a given location is plotted vs. position along the paper chromatogram. The position 0 shown on the abscissa axis indicates the insertion point of the mixture subjected to electrophoresis. The curve to the left of position 0 shows the migration of the mixture components under the influence of the electric field. The presence of transglucosidase is indicated by the height of the curve at position 10. Amyloglucosidase is indicated at position 12. FIG. 2 shows the density plot obtained from the purified material. There is no detectable transglucosidase and the amyloglucosidase portion of the curve is substantially identical with that of FIG. 1 indicating minimum change in amyloglucosidase activity.

EXAMPLE 2

A 500 ml. portion of Amberlite 200 cationic ion-exchange material in the free sulfonic acid form was placed into a 4 cm. I.D. vertical glass tube. The cationic material was washed to a pH of 4.5. A 6500 ml. portion of aqueous amyloglucosidase solution prepared as in Example 1 was passed down through the packed ion-exchange bed and was collected in 250 ml. fractions. Amyloglucosidase recovery was 93.5 percent. Transglucosidase activity in the starting material was indicated by an optical rotation of 55.5. The average optical rotation for collected fractions 1–12 was 54.6 which indicated significant removal of transglucosidase by ion-exchange treatment. The cationic material became fully loaded after fraction 12 was collected and subsequent fractions had transglucosidase activity the same as the starting material. The liquid from fractions 1–12 (3000 ml.) was evaporated and concentrated to 600 ml. The concentrate contained 25.0 amyloglucosidase units per ml. for an overall recovery during concentration of 97.2 percent. The specific rotation of the concentrate was 54.2 indicating that even in a concentrated form the transglucosidase activity is substantially below that of the original enzyme solution prior to ion-exchange treatment.

EXAMPLE 3

A 500 ml. portion of Amberlite IRC 50 cationic ion-exchange material in the free carboxylic acid form was placed into a 4 cm. I.D. vertical glass tube and washed to a pH of 4.3. A 6500 ml. portion of aqueous amyloglucosidase solution prepared as in Example 1 was passed down through the packed bed and was collected in 250 ml. fractions. Amyloglucosidase recovery was 100 percent. Optical rotation of starting material was 56.5 while the average optical rotation of product fractions was 54.4 indicating substantial removal of transglucosidase. A 4200 ml. portion of the purified product was evaporated to 700 ml. The concentrate had an optical rotation of 54.5 which is well below that of the original enzyme solution before ion exchange treatment. There was a recovery of 100 percent of the amyloglucosidase during this concentration.

EXAMPLE 4

A 100 ml. portion of Amberline 200 cationic ion-exchange material in the free sulfonic acid form was placed into a 2 cm. I.D. vertical glass tube and washed to a pH of 5.0. A 500 ml. portion of aqueous amylglucosidase solution prepared as in Example 1 was passed down through the packed bed and was collected in 14 ml. fractions. Amyloglucosidase recovery was 93.5 percent. Optical rotation of starting material was 55.1 while the average optical rotation of product fractions was 53.5 indicating substantial removal of transglucosidase.

EXAMPLE 5

A 100 ml. portion of Amberlite IRC 50 cationic ion-exchange material in the sodium salt form was placed into a 2 cm. I.D. vertical glass tube and washed to a pH of 7.5. A 600 ml. portion of aqueous amyloglucosidase solution prepared as in Example 1 was passed down through the packed bed and was collected in 20 ml. fractions. Amyloglucosidase recovery was 92.3 percent. Optical rotation of the starting material was 55.4 while the average optional rotation of fractions 1–20 inclusive was 54.3 indicating substantial removal of transglucosidase.

EXAMPLE 6

A 100 ml. portion of Amberlite 200 cationic ion-exchange material in the sodium salt form was placed into a 2 cm. I.D. vertical glass tube and washed to a pH of 9.5. A 500 ml. portion of aqueous amyloglucosidase solution prepared as in Example 1 was passed down through the packed bed and was collected in thirty-five 14 ml. fractions. Amyloglucosidase recovery was about 92 percent. Optical rotation of the starting material was 55.4 while the average optical rotation of the product fractions 1–10 inclusive was 54.4 indicating substantial removal of transglucosidase. The ion-exchange material became saturated with transglucosidase after collection of fraction 10. Optical rotation (average) for fractions 11–35 inclusive was 55.3, the same as the starting material, indicating no transglucosidase removal from these fractions.

EXAMPLE 7

A 50 ml. portion of Duolite C-65 cationic ion-exchange material in the sodium salt form was placed into a 2 cm. I.D. vertical glass tube and washed to a pH of 7.5. An 869 ml. portion of aqueous amyloglucosidase solution prepared as in Example 1 was passed down through the packed bed and was collected in 45 ml. fractions. Amyloglucosidase recovery was 95.0 percent. Optical rotation of the original material was 55.8 while the average optical rotation of the product fractions was 54.35 indicating substantial removal of transglucosidase.

The prior art has suggested the use of anionic ion-exchange materials for removal of transglucosidase impurity from amyloglucosidase. The following example describes the use of such anionic ion-exchange material.

EXAMPLE 8

A 100 ml. portion of Duolite A-2 anionic ion-exchange material (marketed by Chemical Process Company and contains phosphate reactive group) was placed into a 2 cm. I.D. vertical glass tube and washed to a pH of 6.3. A 485 ml. portion of aqueous amyloglucosidase solution prepared as in Example 1 was passed down through the packed bed and was collected in 50 ml. fractions. The column was washed with distilled water to form a total effluent volume of 550 ml. The amyloglucosidase recovery was 92 percent. Optical rotation of the original material was 55.3 while the optical rotation of the fractions averaged 55.2. There was thus no removal of transglucosidase by an anionic ion-exchange material employed in this manner.

In summary, the present invention relates to the use of a cationic ion-exchange material to selectively remove all transglucosidase impurity from an amyloglucosidase solution without appreciable loss or adsorption of amyloglucosidase. As such, this is a distinct advantage over the prior art. Purification is more complete, amyloglucosidase loss is less and the process is more convenient since selective elution for recovery of amyloglucosidase is eliminated.

What is claimed:

1. A process for the purification of amyloglucosidase which comprises contacting a cationic ion-exchange material selected from the class consisting of cationic ion-exchange resins and cationic ion-exchange cellulose with an amyloglucosidase solution containing a transglucosidase impurity to selectively adsorb the transglucosidase impurity by the cationic ion-exchange material without adsorbing any appreciable amount of amyloglucosidase.

2. A process for the purification of amyloglucosidase which comprises passing an aqueous solution of amyloglucosidase containing a transglucosidase impurity through a bed of cationic ion-exchange material selected from the class consisting of cationic ion-exchange resins and cationic ion-exchange cellulose whereby the transglucosidase impurity is selectively removed from the solution by the cationic ion-exchange material with minimum removal of amyloglucosidase, and then separating the so purified aqueous solution of amylglucosidase from the cationic ion-exchange material containing the transglucosidase impurity.

3. A process as claimed in claim 2 wherein the cationic ion-exchange material is in the free acid form.

4. A process as claimed in claim 2 wherein the cationic ion-exchange material is in the salt form.

5. A process for the purification of amyloglucosidase which comprises contacting a cationic ion-exchange material selected from the class consisting of cationic ion-exchange resins and cationic ion-exchange cellulose with an amyloglucosidase solution containing a transglucosidase impurity to selectively remove the transglucosidase impurity with minimum removal of amyloglucosidase, separating the so-purified amyloglucosidase solution from the cationic ion-exchange material, repeating the above steps until the cationic ion-exchange material becomes substantially saturated with transglucosidase impurity, regenerating the cationic ion-exchange material to remove the transglucosidase impurity from such material, and then reusing the cationic ion-exchange material for further purification of amyloglucosidase solutions.

6. A process for the purification of amyloglucosidase which comprises passing an aqueous solution of amyloglucosidase containing a transglucosidase impurity through a bed of cationic ion-exchange material selected from the class consisting of cationic ion-exchange resins and cationic ion-exchange cellulose whereby the transglucosidase impurity is selectively removed from the solution by the cationic ion-exchange material with minimum removal of amyloglucosidase, separating the so purified aqueous solution of amyloglucosidase from the cationic ion-exchange material containing the transglucosidase impurity, regenerating the cationic ion-exchange material to remove the transglucosidase impurity from such material, and then reusing the cationic ion-exchanging material for further purification of aqueous amyloglucosidase solutions.

References Cited by the Examiner

UNITED STATES PATENTS 3,042,584　7/1962　Kooi et al. _____ 195—31

OTHER REFERENCES

Helfferich, Ion Exchange, 1962, McGraw-Hill, pp. 10, 11 and 21.

Peterson et al., JACS 78, 751–756 (1956).

Rhodes et al., Journal Biological Chemistry 230, 399–408 (1958).

Pazur et al., Journal of Biological Chemistry 234, 1966–1970 (1959).

A. LOUIS MONACELL, *Primary Examiner.*

L. M. SHAPIRO, *Examiner.*